Aug. 24, 1948.    A. F. DANIEL    2,447,493
SEALING DEVICE FOR DRY CELLS
Filed April 12, 1945

*INVENTOR.*
ARTHUR F. DANIEL
BY
*William D. Hall*
ATTORNEY

Patented Aug. 24, 1948

2,447,493

UNITED STATES PATENT OFFICE 2,447,493

SEALING DEVICE FOR DRY CELLS

Arthur F. Daniel, Fairhaven, N. J., assignor to the United States of America as represented by the Secretary of War Application April 12, 1945, Serial No. 588,049

4 Claims. (Cl. 136—133)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to primary cells and more particularly to sealing means for said cells.

An object of my invention is to provide improved sealing means for a cell of the metal oxide-zinc type.

Another object of my invention is to provide a dish-shaped metal disc adapted so as to have the edges of said dish-shaped metal disc compressibly sealed with a grommet of resilient material.

Another object of my invention is to provide a grommet of resilient material whose inward portion is solidly molded across, adapted so as to form a compressible seal between the edges of said dish-shaped metal disc and the free edge and shoulder of a cell container.

Another object of my invention is to provide a solidly fastened connector attached to said dish-shaped metal disc extending upwardly through a small slit and cemented around said slit in the solidly molded across inward portion of said grommet of resilient material, adapted so as to form the negative terminal of a cell.

A still further object of my invention is to provide a dish-shaped metal disc adapted so as to make an electric contact with the anode of a cell.

A primary cell is known in the art comprising an anode in the form of a strip of corrugated zinc foil contained within a roll of alkali-resistant material, a cathode containing mercuric oxide as a depolarizer, an electrolyte comprising a solution of potassium hydroxide saturated with zinc oxide, said electrolyte being held absorbed within said roll of alkali-resistant absorbent material, a container for said cell parts of iron or steel, said container being in contact with said depolarizer cathode of reducible mercuric oxide so as to form the positive terminal of said cell, and a zinc top for said container which forms the cover and the negative terminal of said cell, said zinc top being fitted into an elastic "neoprene" ring or grommet, said zinc top and "neoprene" ring assembly resting on the shoulder formed in the container wall, the free edge of the container being spun firmly down over the top edge of the grommet.

The herein described cell under test was observed to have a tendency to leak or to have a certain amount of creepage of the potassium hydroxide electrolyte. My invention will eliminate said leakage and prevent the creepage of the potassium hydroxide electrolyte.

My invention will be more fully understood from the following detailed description taken in connection with the accompanying drawing, wherein I have shown a preferred embodiment thereof.

Referring to the drawing.

Figure 1:
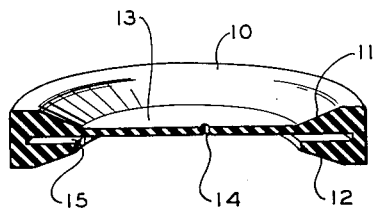
Fig. 1 is a sectional perspective view of the grommet.

Referring to Fig. 1, my device consists of a grommet of resilient material 10 such as neoprene or the like which is beveled inwardly on the top side of said grommet at 11 and on the bottom side at 12. The inward portion of said grommet 10 is solidly molded across at 13 with a small slit 14, and below said solidly molded portion 13 is a circular channel 15.

Figure 2:
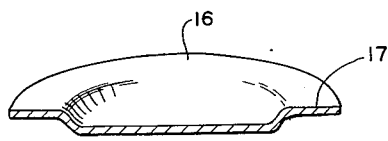
Fig. 2 is a sectional perspective view of the metal disc.

Referring to Figure 2, the outer edge or peripheral flange 17 of the dish-shaped metal disc 16 fits compressibly within the circular channel 15 of said grommet 10 of Fig. 1.

Figure 3:
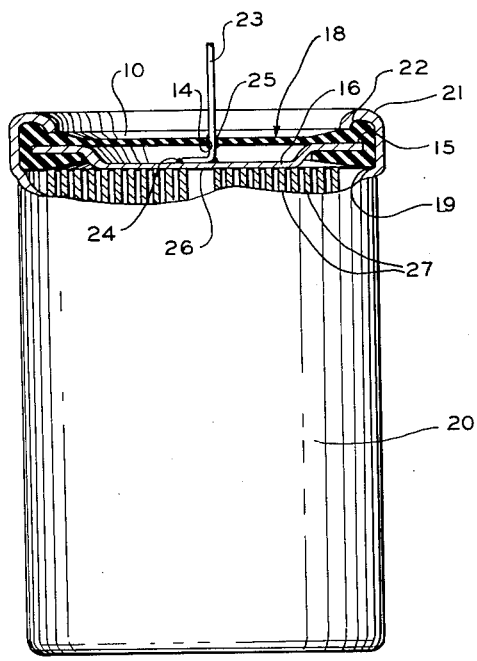
Fig. 3 is a sectional view of the cell assembly.

Referring to Fig. 3, the metal disc 16 is shown in the assembled position and forms a compressible seal with the surface around the circular channel 15 of said grommet 10. The metal disc-grommet assembly 18 rests compressibly upon the shoulder 19 of the container 20. The free edge 21 of said container 20 is spun firmly down over the top edge 22 of said grommet 10. The connector 23 is solidly connected to the dish-shaped portion of said metal disc 16 at 24 and extends upwardly through the small slit 14, sealed with cement 25, in said grommet 10. The underside 26 of the dish-shaped portion of said metal disc 16 makes close electric contact with anode 27.

Having thus described my invention I desire to secure by Letters Patent and claim:

1. In a primary cell having electrodes, a metallic disc contacting one of the electrodes and having an elevated peripheral flange, and a resilient rubber sealing disc over and completely covering the metallic disc and having a groove which receives the flange of the metallic disc to grip the same and provide a leakproof structure.

2. In a primary cell having electrodes, a metallic disc contacting one of the electrodes and having an elevated peripheral flange, and a resilient sealing disc over and completely covering the metallic disc and having a groove which receives the flange of the metallic disc to grip the same and provide a leakproof structure.

3. In a primary cell having electrodes, a metallic disc contacting one of the electrodes and having an elevated peripheral flange, and a resilient rubber sealing disc over and completely covering the metallic disc and having a thickened peripheral portion with an internal groove which receives the flange of the metallic disc to grip the same and provide a leakproof structure.

4. In a primary cell having electrodes, a metallic disc contacting one of the electrodes and having an elevated peripheral flange, and a resilient sealing disc over and completely covering the metallic disc and having a thickened peripheral portion with an internal groove which receives the flange of the metallic disc to grip the same and provide a leakproof structure.

ARTHUR F. DANIEL.

REFERENCES CITED

The following references are of record in the file of this patent:

UNITED STATES PATENTS

| Number | Name | Date |
|---|---|---|
| 1,611,153 | Benner et al. | Dec. 21, 1926 |
| 2,026,615 | Corigliano et al. | Jan. 7, 1936 |
| 2,057,790 | Potter et al. | Oct. 20, 1936 |
| 2,103,714 | Drummond | Dec. 28, 1937 |
| 2,144,959 | Blackburn | Jan. 24, 1939 |